(12) United States Patent
Shirai et al.

(10) Patent No.: US 7,035,941 B2
(45) Date of Patent: Apr. 25, 2006

(54) METHOD OF AND DEVICE FOR DECIDING NETWORK ADDRESS, AND COMPUTER PRODUCT

(75) Inventors: Takehiro Shirai, Kanagawa (JP); Hironao Tokitsu, Kanagawa (JP)

(73) Assignee: Routrek Networks, Inc., Kanagawa (JP)

( * ) Notice: Subject to any disclaimer, the term of this patent is extended or adjusted under 35 U.S.C. 154(b) by 840 days.

(21) Appl. No.: 09/887,139

(22) Filed: Jun. 25, 2001

(65) Prior Publication Data

US 2001/0056499 A1    Dec. 27, 2001

(30) Foreign Application Priority Data

Jun. 23, 2000   (JP)   ............... 2000-190206

(51) Int. Cl.
*G06F 13/00*   (2006.01)

(52) U.S. Cl. .................................................. 709/245
(58) Field of Classification Search ................ 709/245, 709/200

See application file for complete search history.

(56) References Cited

U.S. PATENT DOCUMENTS

| 5,150,464 A | * | 9/1992 | Sidhu et al. | ................ 709/222 |
| 5,331,634 A | * | 7/1994 | Fischer | ....................... 370/405 |
| 5,603,086 A | * | 2/1997 | Cree et al. | .................. 455/520 |
| 5,724,510 A | * | 3/1998 | Arndt et al. | ................. 709/220 |
| 6,678,725 B1 | * | 1/2004 | Britton et al. | .............. 709/220 |
| 6,792,474 B1 | * | 9/2004 | Hopprich et al. | ........... 709/245 |

* cited by examiner

*Primary Examiner*—Robert B. Harrell
(74) *Attorney, Agent, or Firm*—Sughrue Mion, PLLC

(57) ABSTRACT

A method for automatically deciding an Internet address of a device newly connected to a network is provided. Addresses of all the other devices connected to the network are collected by receiving and analyzing signals flowing through the network. IP address for the newly connected device is selected in such a manner that it is different from any of the collected addresses. It is checked whether the selected IP address matches with the IP address of any of other device connected to the network. If the selected IP address matches with the IP address of any other device, the selection of the IP address is repeated until the selected IP address does not match with the IP address of any other device.

6 Claims, 11 Drawing Sheets

FIG. 3

ADDRESS TABLE

| IP ADDRESS | MAC ADDRESS |
|---|---|
| 192.168.1.1 | 00:00:0C:10:00:28 |
| 192.168.1.2 | 00:60:08:00:C0:1B |
| ⋅ | ⋅ |
| ⋅ | ⋅ |
| ⋅ | ⋅ |
| ⋅ | ⋅ |
| ⋅ | ⋅ |
| 192.168.1.253 | 00:05:C2:02:18:71 |
| 192.168.1.254 | 00:50:32:4B:2C:01 |

FIG. 4

ADDRESS RESOLUTION REQUEST PACKET

| IP ADDRESS | 192.168.1.○○○ |
|---|---|
| MAC ADDRESS | △△:△△:△△:△△:△△ |
| ACQUISITION REQUESTED IP ADDRESS | 192.168.1.●●● |

F I G. 5

ADDRESS RESOLUTION RESPONSE PACKET (WHEN ACQUISITION REQUESTED IP ADDRESS OF RECEIVED ADDRESS RESOLUTION REQUEST PACKET IS COINCIDENT WITH ITS OWN IP ADDRESS, ADDRESS RESOLUTION RESPONSE PACKET IS SENT TO TRANSMITTER.)

| ITS OWN IP ADDRESS | 192.168.1.○○○ |
|---|---|
| ITS OWN MAC ADDRESS | △△:△△:△△:△△:△△ |

FIG. 9

| | DECIMAL NUMBER | BINARY NUMBER |
|---|---|---|
| IP ADDRESS | 192.168.0.1 | 11000000.10101000.00000000.00000001 |
| NET MASK | 255.255.255.0 | 11111111.11111111.11111111.00000000 |

FIG. 10

| CLASS | DEFAULT MASK (DECIMAL NUMBER) | CORRESPONDING IP ADDRESS RANGE | HOSTS PER NETWORK |
|---|---|---|---|
| A | 255.0.0.0 | 1.0.0.0 ~ 126.0.0.0 | 16000000 |
| B | 255.255.0.0 | 128.1.0.0 ~ 191.254.0.0 | 65534 |
| C | 255.255.255.0 | 192.0.1.0 ~ 223.255.254.0 | 254 |

FIG. 11

COLLECTED IP ADDRESS (EXAMPLES)

| DECIMAL NUMBER | BINARY NUMBER |
|---|---|
| 192.168.0.1 | 11000000.10101000.00000000.00000001 |
| 192.168.0.4 | 11000000.10101000.00000000.00000100 |
| 192.168.0.6 | 11000000.10101000.00000000.00000110 |
| 192.168.0.10 | 11000000.10101000.00000000.00001010 |

FIG. 12

(1) Sectioned at 1-bit from the right

| NUMBERS TO BE COMPARED | 1(BIT) |
|---|---|
| 11000000.10101000.00000000.0000000 | |
| 11000000.10101000.00000000.0000010 | |
| 11000000.10101000.00000000.0000011 | |
| 11000000.10101000.00000000.0000101 | |

→ IP NETWORK ADDRESS AND SUB-NET MASK CAN'T BE DECIDED.

(2) Sectioned at 2-bit from the right

| NUMBERS TO BE COMPARED | 2(BIT) |
|---|---|
| 11000000.10101000.00000000.000000 | |
| 11000000.10101000.00000000.000001 | |
| 11000000.10101000.00000000.000001 | |
| 11000000.10101000.00000000.000010 | |

→ IP NETWORK ADDRESS AND SUB-NET MASK CAN'T BE DECIDED.

(3) Sectioned at 3-bit from the right

| NUMBERS TO BE COMPARED | 3(BIT) |
|---|---|
| 11000000.10101000.00000000.00000 | |
| 11000000.10101000.00000000.00000 | |
| 11000000.10101000.00000000.00000 | |
| 11000000.10101000.00000000.00001 | |

→ IP NETWORK ADDRESS AND SUB-NET MASK CAN'T BE DECIDED.

(4) Sectioned at 4-bit from the right

| NUMBERS TO BE COMPARED | 4(BIT) |
|---|---|
| 11000000.10101000.00000000.0000 | |
| 11000000.10101000.00000000.0000 | |
| 11000000.10101000.00000000.0000 | |
| 11000000.10101000.00000000.0000 | |

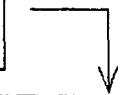

| | DECIMAL NUMBER | BINARY NUMBER |
|---|---|---|
| IP NETWORK ADDRESS | 192.168.0.0 | 11000000.10101000.00000000.00000000 |
| SUB-NET MASK | 255.255.255.240 | 11111111.11111111.11111111.11110000 |

(5) Sectioned at 5-bit from the right

| NUMBERS TO BE COMPARED | 5(BIT) |
|---|---|
| 11000000.10101000.00000000.000 | |
| 11000000.10101000.00000000.000 | |
| 11000000.10101000.00000000.000 | |
| 11000000.10101000.00000000.000 | |

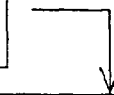

| | DECIMAL NUMBER | BINARY NUMBER |
|---|---|---|
| IP NETWORK ADDRESS | 192.168.0.0 | 11000000.10101000.00000000.00000000 |
| SUB-NET MASK | 255.255.255.224 | 11111111.11111111.11111111.11100000 |

⋮

(32) Sectioned at 32-bit from the right

| NUMBERS TO BE COMPARED |
|---|
| |

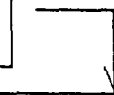

| | DECIMAL NUMBER | BINARY NUMBER |
|---|---|---|
| IP NETWORK ADDRESS | 0.0.0.0 | 00000000.00000000.00000000.00000000 |
| SUB-NET MASK | 0.0.0.0 | 00000000.00000000.00000000.00000000 |

METHOD OF AND DEVICE FOR DECIDING NETWORK ADDRESS, AND COMPUTER PRODUCT

FIELD OF THE INVENTION

This invention relates to a technology for automatically deciding and allocating different address to each device ("non-overlapping address") connected to a network using Internet Protocol ("IP").

BACKGROUND OF THE INVENTION

In order to identify each device such as a computer or a router that is connected to computer network in which IP is used, it is necessary to allocate a non-overlapping address to each device. The term device here means real devices such as personal computers or routers, or virtual devices established on computer program.

Conventionally, such an address is allocated through manual operation by a manager or the like. However, when the address is to be allocated through manual operation, there is problem that the manager is required to previously manage every address of every device and the manager or the user is required to set the address of each device such that it is different from the address of any other device. If by mistake, two devices are allocated with the same address, then collision of address disadvantageously occurs.

The above-mentioned problem maybe solved as follows. That is, a server which will automatically set non-overlapping addresses to each device on the network may be provided. This server may be made to previously store all the usable addresses, and it may be made to allocate a non-overlapping address in response to a request from a device. With this arrangement, non-overlapping addresses can be automatically and surely allocated to the devices. However, there is a drawback that workload increases because it is necessary to provide, maintain, and manage such a server.

SUMMARY OF THE INVENTION

It is an object of this invention to provide a method by which a device on the network can decide and allocate itself a non-overlapping address without using a server. It is an another object of this invention to provide a device that can realize the method according to this invention. It is still another object of this invention to provide a computer readable recording medium that stores a computer program which when executed realizes the method according to the present invention.

The method according to one aspect of this invention comprises following steps. That is, detecting and collecting addresses of all the other devices connected to the network by receiving and analyzing signals flowing through the network; and selecting an IP address, which is different from the collected addresses, from among a group of applicable IP addresses.

The method according to another aspect of this invention comprises following steps. That is, detecting addresses of all the other devices connected to the network by receiving and analyzing signals flowing through the network; selecting an IP address and a MAC address among the detected addresses to pose as a device having the IP address and the MAC address; sending a destination signal on the network by using the address of the posed device, and collecting addresses of other devices by acquiring responses to the destination signal; and selecting an IP address, which is different from the collected addresses, among a group of applicable IP addresses.

The method according to still another aspect of this invention comprises following steps. That is, detecting and collecting addresses of all the other devices connected to the network by receiving and analyzing signals flowing through the network; sectioning binary numerals of the collected IP address at Nth bit ($1 \leq N \leq K$, K is a predetermined natural number) from a minimum digit, and defining digits not less than the Nth bit as high rank bits and digits lower than Nth bit as low rank bits; judging whether all of the high rank bits of the collected IP addresses are same; if all of the high rank bits are not same, changing N to N+1, N−1, or to a desired number, and sectioning the binary numerals in the step of sectioning to make the judgment at the judgment step; repeating the number changing step until all of the-high rank bits become same; if all of the high rank bits are same, adopting a value expressed by binary number composed of the same high rank bits and low rank bits set all 0 as IP network address, and adopting a value expressed by binary number composed of high rank bits set all 1 and low rank bits set all 0 as subnet mask; and selecting an IP address, which is different from the IP address of any the other device connected to the network, from among a group of effective IP addresses defined by the IP network address and the subnet mask.

The method according to still another aspect of this invention comprises following steps. That is, selecting an address other than already posed address to pose that address; sending a destination signal on network to any device having IP address that does not respond by using the IP address of the posed device, and collecting address of other devices by acquiring responses to the destination signal; and repeating the selection of the address and sending of the destination signal until the address that is not posed does not exist.

The method according to still another aspect of this invention comprises following steps. That is, restricting address in the range to be searched by using a net mask that has a suitable value; and repeating search of the address range with use of the net mask of smaller value if all matters to be searched are detected.

The method according to still another aspect of this invention comprises following steps. That is, selecting an IP address that is intended to use and its own MAC address; sending an address resolution request packet using the selected IP address as of transmitter and as requested address; observing for a predetermined period of time whether or not an address resolution request packet including the identical IP address used as of transmitter and as requested address and a MAC address different from its own MAC address is sent; when the address resolution request packet is not observed then setting the IP address as its own IP address of the device to finish the operation, and when the address resolution request packet is observed then judging whether the MAC address included in the packet is smaller than its own MAC address; and when the MAC address is smaller than its own MAC address then setting the IP address as its own IP address to finish the operation, when the MAC address is not smaller than its own MAC address then selecting another IP address that is intended to use.

The computer readable recording medium according to still another aspect of the present invention stores a computer program which when executed realizes the method according to the present invention.

The device according to still another aspect of the present invention utilizes the method according to the present invention to automatically allocate itself a non-overlapping IP address.

Other objects and features of this invention will become apparent from the following description with reference to the accompanying drawings.

BRIEF DESCRIPTION OF THE DRAWINGS

FIG. 3 is a representation of an example of address table;

FIG. 4 is a representation that shows an example of construction of address resolution request packet;

FIG. 5 is a representation that shows an example of construction of address resolution response packet;

FIG. 9 is a representation that shows IP address and net mask expressed as decimal number and binary number, respectively;

FIG. 10 is a representation that shows classes of net mask and default value of each class, each IP address range corresponding to each class and numbers of hosts per network;

FIG. 11 is a representation that shows expressions of collected IP address collected (examples); and FIG. 12 is a representation that shows a procedure to determine IP network address and subnet mask.

DESCRIPTION OF THE PREFERRED EMBODIMENTS

Preferred embodiments of the method of and device for deciding network address will be explained in detail below with reference to the accompanying drawings.

Figure 1:
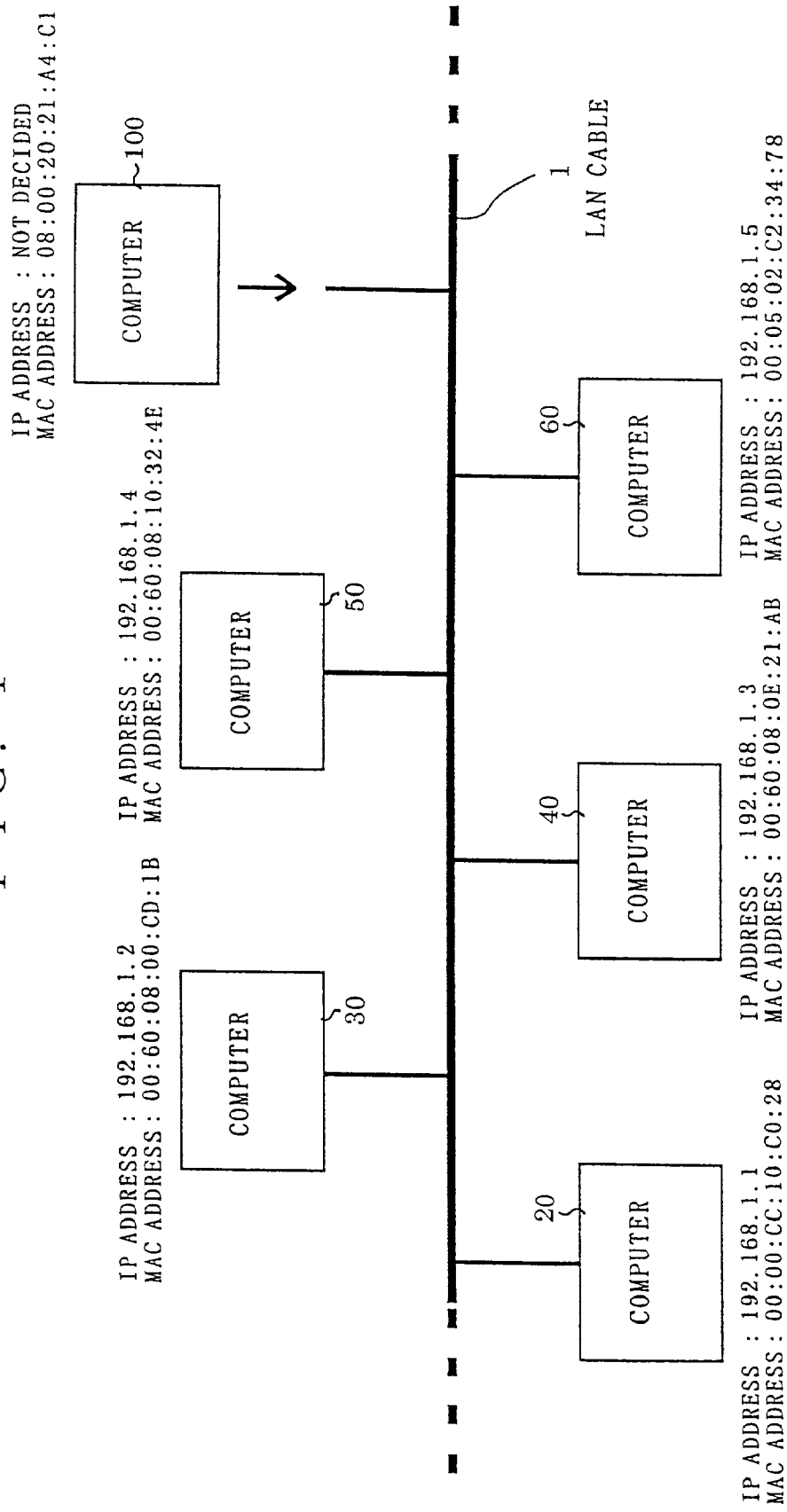
FIG. 1 is a representation of constitution of network for carry out a method according to this invention.

FIG. 1 shows an example of constitution of computer network for carrying out the method of this invention. This computer network includes LAN cable 1 as a means for communication and computers 20 to 60 as the devices that are mutually connected to the Internet through the LAN cable 1.

When performing communications, a packet of data appended with a communication control information, such as destination address, passes though the LAN cable 1. Each computer 20 to 60 is provided with a pair of addresses, i.e. an IP address and MAC address. The IP address is the logical address and the MAC address is the physical address.

MAC address is a media access control address such as the Ethernet address or token ring address, and a medium of a device has its own MAC address.

IP address is the address with which the device can be identified on the Internet. The IP address includes a network address and a host address. The network address is for identifying the LAN cable to which the device is connected. The host address is for identifying each device connected to the same LAN cable. Thus, all the devices connected to same LAN cable must have same network address.

The host address can be extracted from the IP address using a so called net mask. The value of the net mask varies form LAN to LAN. A typical net mask includes net mask of class C that is used for network having capacity of up to 254 hosts.

When a packet is to be transmitted, using IP, from a host device to a destination device, it is necessary to append the IP address and the MAC address of the destination device to the packet. That is, it is necessary for the host device to previously know the MAC address and the IP address of the destination device. In order to know these addresses, the host device transmits (i.e. broadcasts), without specifying any destination, an address resolution request packet appended with that particular IP address. Each device connected to the LAN receives this packet and compares the contained IP address with its own IP address. Only the device having the same IP address as the IP address contained in the address resolution request packet returns an address resolution response packet to the host device. Thus, the host device comes to know the MAC address of the destination device.

The method of obtaining the MAC address corresponding to the IP address is termed as address resolution. ARP (Address Resolution Protocol) is prescribed as the Internet standard. According this protocol, an address resolution request packet containing 1) its own IP address, 2) its own MAC address and 3) IP address to be resolved is broadcasted to network. Each device that has received such a packet inspects the IP address contained in that packet. When the IP address to be resolved is identical with its own IP address, then such a device returns the address resolution response packet that contains its own IP address and MAC address to the device that had transmitted the address resolution request packet. Thus, the device that transmitted the address resolution request packet can obtain the MAC address of the device having the intended Internet address. Then, a data packet containing both IP and MAC addresses is prepared and sent to network, thereby the target device can receive the data packet.

Figure 2:
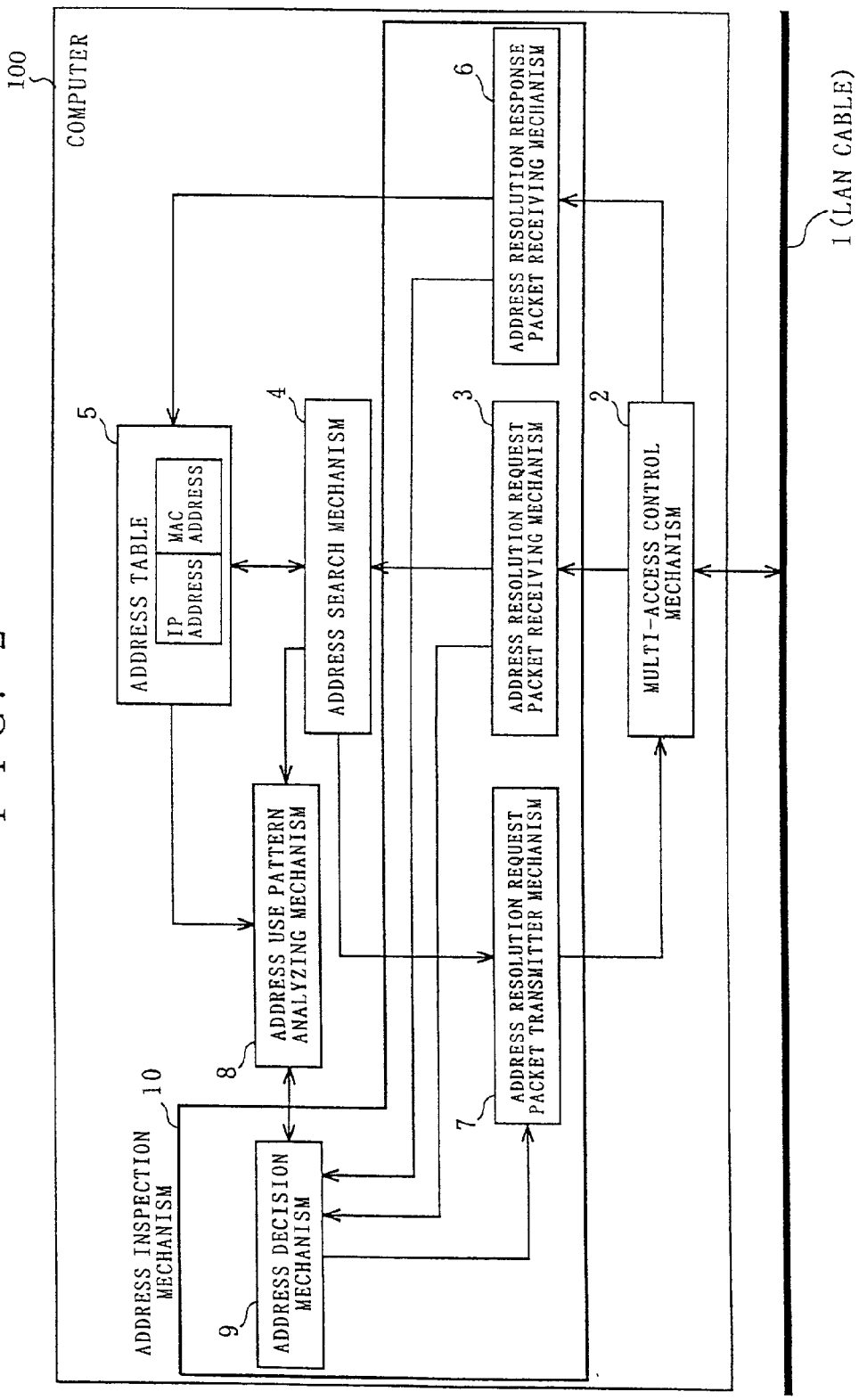
FIG. 2 is a representation that shows a constitution of communication arrangement that is connected to the network.

Assume that computer 100 is newly connected to the LAN cable 1. In order that this computer 100 can automatically decide its own non-overlapping address, the computer 100 should have a constitution for example as shown in FIG. 2.

The computer 100 is provided with the multi-access control mechanism 2 which sends a packet to and receives a packet from the LAN cable 1. Furthermore, the address resolution request packet receiving mechanism 3 processes only the address resolution request packet in the contents of the received packet. This address resolution request packet contains data regarding IP address, MAC address of the transmitter, and an acquisition requested IP address shown in FIG. 4.

Furthermore, the computer 100 is provided with the address search mechanism 4 that receives the address resolution request packet from the address resolution request packet receiving mechanism 3 and extracts the IP address and MAC address contained in that packet. Then, the address search mechanism 4 stores the extracted addresses, in the form of a table, in a removable or in-built memory and sets, the extracted as addresses allocated to the computer 100. In other words the computer 100 pretends as if it is the device that is allocated with the address contained in the packet. The address search mechanism 4 repeats this operation each time when it receives the packet. As the result, IP addresses of all the devices connected to the network are stored in the address table. An example of the address table 5 as shown in FIG. 3.

Furthermore, the computer 100 is provided with the address resolution response packet receiving mechanism 6 which processes only an address resolution response packet contained in the packet received by the multi-access control mechanism 2. This address resolution response packet receiving mechanism 6 stores the IP address and MAC address contained in that address resolution response packet in a tabular form. FIG. 5 shows an example of the address table 5. The address resolution response packet contains "its own IP address" and "its own MAC address".

Furthermore, the computer 100 is provided with the address resolution request packet transmitter mechanism 7 which uses the addresses of the device impersonated by the address search mechanism 4, and transmits the address resolution request packet to every device on network.

Furthermore, the computer 100 is provided with the address use pattern analyzing mechanism 8 which extracts a characteristic in use of the Internet address by referring to the address table 5 and selects such an Internet address that will having lowest probability of occurrence of an overlap.

Furthermore, the computer 100 is provided with the address decision mechanism 9 which decides whether the Internet address selected by the address use pattern analyzing mechanism 8 overlaps with the address of any other device. If this address decision mechanism 9 decides that the selected address overlaps with the address of some other device, then it requests the address use pattern analyzing mechanism 8 to select another candidate address. When the address use pattern analyzing mechanism 8 selects another candidate address, the address decision mechanism 9 decides whether the selected candidate address overlaps with the address of some other device.

The address resolution request packet receiving mechanism 3, address resolution response packet receiving mechanism 6, address resolution request packet transmitter mechanism 7 and address decision mechanism 9 constitute the address inspection mechanism 10.

Operation of the computer 100 will be explained below while referring to the flowchart shown in FIG. 6. When the computer 100 is connected to the LAN cable 1, the multi-access control mechanism 2 receives a packet flowing through the network and checks whether that packet contains the address resolution request packet (step ST1). When the received packet contains the address resolution request packet, the multi-access control mechanism 2 transfers the address resolution request packet to the address resolution request packet receiving mechanism 3.

Then, it is checked whether the IP address of the transmitter is different from the acquisition requested IP address (step ST2). If the two IP addresses are same, then the system control is returned to step ST1. If the two IP addresses are different, then the system control is passed to step ST8 and subsequent steps are executed as described later.

If is decided in the step ST1 that the received packet does not contain the address resolution request packet, and in addition, a predetermined period of time has passed (step ST3), then it is assumed that no other device is connected to the network (other that the computer 100) and an address is selected at random among predetermined network addresses (step ST4). In other words, when the address resolution request packet is not received in a predetermined period of time, then it is assumed that only the computer 100 is connected to the network.

Then, address inspection is executed by the address inspection mechanism 10 (step ST5). In the address inspection, it is checked whether the selected overlaps with addresses of any other device. This address inspection will be explained in more detail later while referring to FIG. 8.

In step ST6 it is decided whether the result of address inspection at step ST5 is "YES" or "NO". When the result is "NO" i.e. when the selected address do not overlap with other address, the selected address is recorded as the address of the computer 100 (step ST7), and the address allocation process is completed. When the result of address inspection is "NO" i.e. when the selected address overlaps with some other address, then the system control is passed to step ST16 (see FIG. 7) and subsequent steps are executed as described later.

If the result of judgment at step ST2 is "YES", i.e. when the two IP addresses are different, then at step ST8, the address resolution request packet receiving mechanism 3 stores, in the address table 5, only the effective address resolution request packets in which IP address of transmitter is different from the requested IP address. The address search mechanism 4 collects IP address and MAC address of all the devices on network.

The address search mechanism 4 selects one IP address and corresponding MAC address stored in the address table 5 and commands the address resolution request packet transmission mechanism 7 to send an address resolution request packet that contains the selected addresses as its own addresses to all the devices in effective range of the selected address found by analysis of the selected Internet address (step ST9).

An address resolution request packet that requests resolution of Internet address in the effective range is transferred from the address resolution request packet transmission mechanism 7 that receives the command to the multi-access control mechanism 2 and is broadcasted on network (step ST10) A device on network that received this address resolution request packet returns an address resolution response packet. The multi-access control mechanism 2 receives this address resolution request packet and transfer it to the address resolution response packet receiving mechanism 6.

The address resolution response packet receiving mechanism 6 analyzes the packet and stores the IP address and MAC address, contained in that packet, of the device that sent the packet, in the address table 5 (step ST11).

When a connection device having a filter function such as bridge or switching hub is connected between networks, the connection device automatically learns places of devices of respective MAC addresses and sometimes filters off not to transmit to a LAN that is not connected to the learned devices.

As the result, it occurs sometimes due to the filter function that the expected address resolution response packet is transferred to the impersonated original device and is not transferred to the impersonating stealth device that transmitted the address resolution request packet. In order to prevent such trouble, the search of address is continued by personating every device found on network by round robin.

Figure 7:
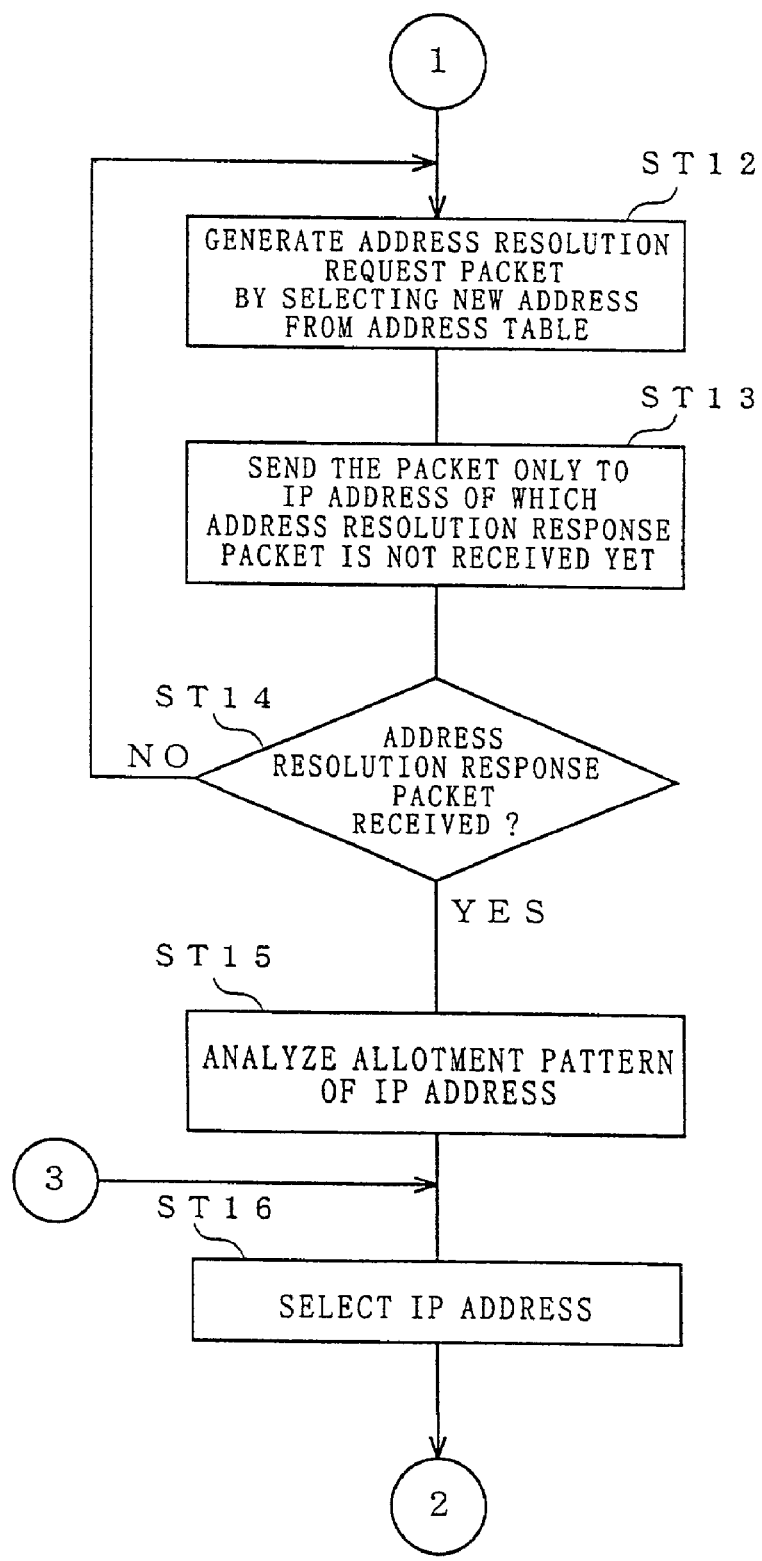
FIG. 7 is a continuation of flowchart of FIG. 6.

Specifically, as shown in FIG. 7, a new pair of IP address and MAC address is selected from the address table 5 and the address resolution request packet is generated (step ST12). The impersonating address resolution request packet is sent only to devices having IP address that does not return any address resolution response packet yet from the address resolution request packet transmission mechanism 7 (step ST13). If an address resolution response packet is not returned, then the system control is returned to step ST12, and the process at steps ST12 and ST13 is repeated (step ST14).

When the search is completed by round robin, all the pairs of IP address and MAC address of all the devices connected to the network are registered in the address table 5.

Subsequently, the address search mechanism 4 activates the address use pattern analyzing mechanism 8 to analyze the allotment pattern of the IP address (step ST15) based on whether the address has been assigned from small number, or assigned from large number, or assigned at random, or assigned from a number of middle, or assigned from both of small and large number.

Subsequently, a most broad idle address range among address space that is not adjacent already occupied address space is searched. An IP address is selected at random among the address range and transferred to the address decision mechanism 9 (step ST16). Then, the address decision mechanism 9 executes a procedure of address inspection (ST5) again.

Figure 8:
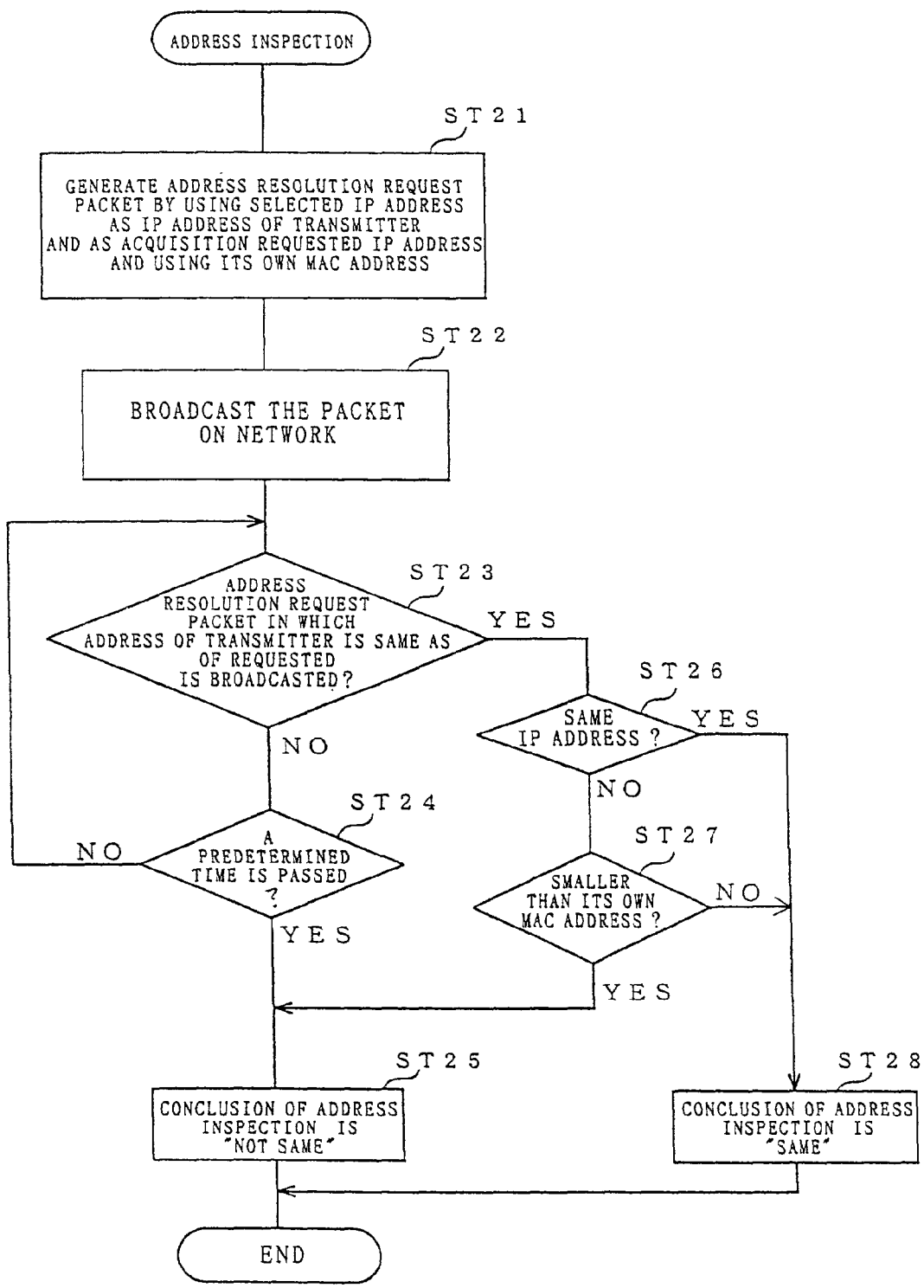
FIG. 8 is a flowchart that shows operation procedure of address inspection.

The address inspection will now be explained in more detail while referring to FIG. 8. The address decision mechanism 9 generates an invalid address resolution request packet using the selected IP address as IP address of transmitter and also as requested address (step ST21) and broadcasts the packet on network through the LAN cable (step ST22). Its own MAC address is used as MAC address of transmitter. This declares address decision to other devices adopting the similar method. Then broadcast another address decision declaration in which one IP address is used as IP address of transmitter and as resolution requested IP address is checked (step ST23) for a predetermined period of time (step ST24).

If another address resolution request packet in which its IP address of transmitter is same as its resolution requested IP address is not transmitted until the predetermined period of time has passed, the declared IP address is confirmed not to overlap with IP address of the other devices and concluded as "not same" (step ST25) to finish the address inspection.

If another address resolution request packet in which IP address of transmitter is same as resolution requested IP address is received, then it is judged whether the IP address is same as the IP address that is intended to be used (step ST26). If the IP address is not the one that is intended to be used, conclusion of the address inspection is "not same". If the IP address is the one that is intended to be used, then the MAC address is extracted from the packet and it is compared with its own MAC address (step ST27). If the MAC address of the packet is smaller than its own MAC address, conclusion of the address inspection is "not same" by defining as higher priority for use of the IP address. If the MAC address is larger than its own MAC address, conclusion of the address inspection is "same" (step ST28) by defining as less priority for use of the IP address.

Figure 6:
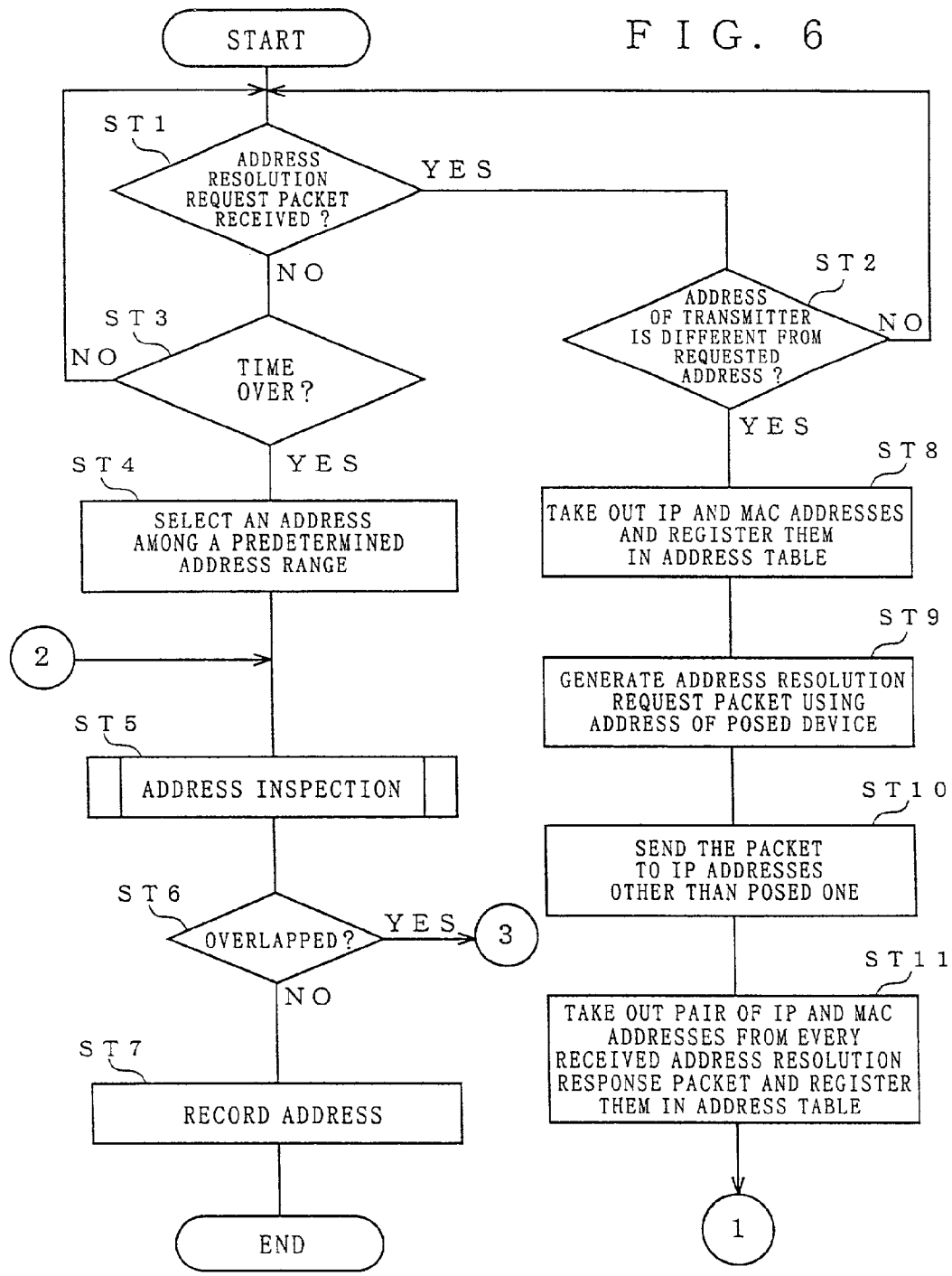
FIG. 6 is a flowchart that shows an operation procedure according to a method of this invention.

Returning to the flowchart of FIG. 6, after completion of the address inspection, whether there is a overlap of addresses is judged (step ST6). when the conclusion of address inspection is "not same", then there will be no overlap of addresses. In such a case, the selected address is stored as the address of its own device and the address allocation process is terminated. When the conclusion of address inspection is "same", then it means that there is an overlap of addresses, i.e. the selected address is already being used by some other device . In this case, system control is passed to step ST16 and subsequent steps are repeated.

With the above-mentioned procedure, each device can decide an address that is not overlapped with autonomy, thereby achieving automatic allotment of IP address.

Next, an explanation about IP network address and subnet mask will be provided. The IP network address and subnet mask are used for selecting non-overlapping IP address among effective address range permitted as IP address in the third method according to this invention.

As shown in FIG. 9, when the decimal IP address 192.168.0.1 and net mask 255.255.255.0 are to be expressed as binary numbers then they respectively become 11000000.10101000.0000000.00000001 and 11111111.1111 1111.11111111.00000000.

These binary numbers comprises network address part to identify a LAN cable and host address part to identify each device connected to the LAN cable. Every device connected to same LAN cable has same value of network address part. A net mask is used for operation to extract host address part from IP address.

As shown in FIG. 10, net mask includes three classes of A, B and C having default values (default mask) being "255.0.0.0", "255.255.0.0", "255.255.255.0" as decimal numbers, respectively. Ranges of IP address corresponding to A, B and C classes are "1.0.0.0–126.0.0.0", "128.1.0.0–191.254.0.0" and "192.0.1.0–223.255.254.0", respectively and numbers of hosts per one network are 16000000, 65534 and 254, respectively.

In this embodiment, illustratively, there are collected four IP addresses of "192.168.0.1", "192.168.0.4", "192.168.0.6", "255.255.255.0" as decimal numbers which are expressed as binary numbers of "11000000.10101000.0000000.00000001", "11000000.101 01000.00000000.00000100", "11000000.10101000.000000 0.00000110", and "11000000.10101000.0000000.000010 10", respectively.

"IP network address" and "subnet mask" are determined based on the four IP addresses as mentioned below.

As shown in FIG. 12, at first, (1) sectioning binary numbers of collected IP address at N=1 bit from the minimum digit and defining digits on or higher than 1 bit as high rank bits and digits lower than 1 bit as low rank bits. Judging whether or not the high rank bits of all collected IP addresses are same. In this case, high rank bits of the four binary numbers are not same. Accordingly, IP network address and subnet mask are not determined.

Then, (2) value of N is changed to N=2 by adding 1 and high rank bits of all collected IP addresses are checked. In this case, high rank bits of the four binary numbers are not same. Accordingly, IP network address and subnet mask are not determined.

Then, (3) value of N is changed to N=3 by adding further land high rank bits of all collected IP addresses are checked. In this case, high rank bits of the four binary numbers are not same. Accordingly, IP network address and subnet mask are not determined.

Then, (4) value of N is changed to N=4 by adding further land high rank bits of all collected IP addresses are checked. In this case, high rank bits of the four binary numbers are same. "IP network address" is determined as a binary number of "11000000.10101000.0000000.00000000" in which numbers forming the high rank bits are unchanged and all numbers forming the low rank bits are made 0 and "subnet mask" is determined as a binary number of "11111111.11111111.11111111.11110000".

Then, (5) number of N is changed to N=5 by adding further land high rank bits of all collected IP addresses are checked. In this case, high rank bits of the four binary numbers are same. "IP network address" is determined as a binary number of "11000000.10101000.0000000.000000 00" in which numbers forming the high rank bits are unchanged and all numbers forming the low rank bits are made 0 and "subnet mask" is determined as a binary number of "11111111.11111111.11111111.11100000".

Thereafter, value of N is increased by 1 (in this embodiment, up to N=32) in the same method as mentioned above, and judgment is carried out whether or not all of the high rank bits are same, and when all of the high rank bits are same, IP network address and subnet mask are determined in the same method as mentioned above. Thus, combinations (in this embodiment, 5 combinations corresponding to N=4–8) of IP network address and subnet mask for deciding IP address to be selected are obtained.

Concretely, (6) When N=6, the "IP network address" is determined as "11000000.10101000.0000000.00000000" and the "subnet mask" is determined as "11111111.11111111.11111111.1100 0000".

(7) When N=7, the "IP network address" is determined as "11000000.10101000.0000000.00000000".

(8) When N=8, the "IP network address" is determined as "11000000.10101000.0000000.00000000" and the "subnet mask" is determined as "11111111.11111111.11111111.000 00000".

Finally when N=32, high rank bit of each IP address does not exist any longer. If high rank bit is assumed same, the "IP network address" is formed as "00000000.00000000.0000 000.00000000" by making all values of low rank bit 0, which are not adopted because both values are "0".

Accordingly, the user of computer 100 that is a device newly connected to the LAN can select an appropriate IP address among effective IP address range corresponding to combinations of IP network address and net mask obtained as mentioned above.

In the above embodiment, the digit N to section the binary numbers of the collected IP addresses is changed by adding 1 to the digit of right terminal (minimum digit) in order. Alternatively, the digit N may be changed by subtracting 1 from the digit of left terminal (maximum digit) or selecting an optional value of digit in a predetermined range (illustratively, $1 \leq N \leq 32$) and changing the value at random.

A computer program containing instructions which when executed on a computer causes the computer to perform the method according to the present invention is recorded on computer readable-recording medium. This computer readable-recording medium may be a floppy disk or a CD-ROM. Alternately the program may be stored at a server and the program may be downloaded when required. Otherwise, the program may be executed while it is at the server, i.e. without downloading from the server.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of selecting an IP address for an added device that does not overlap with other addresses among an effective address range permitted as IP addresses, the method comprises the steps of:

detecting and collecting addresses of all other devices connected with the added device to a network by receiving and analyzing signals flowing through the network;

sectioning binary numerals of the collected IP address at Nth bit ($1 \leq N \leq K$, K is a predetermined natural number) from a minimum digit, and defining digits not less than the Nth bit as high rank bits and digits lower than Nth bit as low rank bits;

judging whether all of the high rank bits of the collected IP addresses are the same;

if all of the high rank bits are not the same, changing N to N+1, N−1, or to a desired number, and sectioning the binary numerals in the step of sectioning to make the judgment at the judgment step;

repeating the number changing step until all of the high rank bits become the same;

if all of the high rank bits are the same, adopting a value expressed by a binary number composed of the same high rank bits and low rank bits set all to 0 as an IP network address, and adopting a value expressed by a binary number composed of high rank bits set all to 1 and low rank bits set all to 0 as subnet mask; and selecting an IP address, which is different from the IP address of any other device connected to the network, from among a group of effective IP addresses defined by the IP network address and the subnet mask.

2. A method for automatically deciding a value of an Internet address that is not overlapped in an environment where a plurality of similar IP address deciding devices, each having its own MAC address, are used, the method comprising at an IP address deciding device the steps of:

selecting an IP address that is intended for use and its own MAC address;

sending an address resolution request packet using the selected IP address as that of a transmitter and as a requested address;

observing for a predetermined period of time whether or not an address resolution request packet, including an identical IP address used as that of a transmitter and as a requested address and a MAC address different from its own MAC address, is sent;

when the address resolution request packet is not observed, then setting the IP address as its own IP address to finish the operation, and when the address resolution request packet is observed, then judging whether the MAC address included in the packet is smaller than its own MAC address; and when the MAC address is smaller than its own MAC address, then setting the IP address as its own IP address to finish the operation, and when the MAC address is not smaller than its own MAC address, then selecting another IP address that is to be used.

3. A computer readable medium for storing instructions, which when executed on a computer, causes the computer to perform a method of selecting an IP address for an added device that does not overlap with other addresses among an effective address range permitted as IP addresses, the method comprises the steps of:

detecting and collecting addresses of all other devices connected with the added device to a network by receiving and analyzing signals flowing through the network;

sectioning binary numerals of the collected IP address at Nth bit ($1 \leq N \leq K$, K is a predetermined natural number) from a minimum digit, and defining digits not less than the Nth bit as high rank bits and digits lower than Nth bit as low rank bits;

judging whether all of the high rank bits of the collected IP addresses are the same;

if all of the high rank bits are not same, changing N to N+1, N−1, or to a desired number, and sectioning the binary numerals in the step of sectioning to make the judgment at the judgment step;

repeating the number changing step until all of the high rank bits become the same;

if all of the high rank bits are the same, adopting a value expressed by a binary number composed of the same high rank bits and low rank bits set all to 0 as an IP network address, and adopting a value expressed by a binary number composed of high rank bits set all to 1 and low rank bits set all to 0 as subnet mask; and selecting an IP address, which is different from the IP address of any other device connected to the network, from among a group of effective IP addresses defined by the IP network address and the subnet mask.

4. A computer readable medium for storing instructions, which when executed on a computer, causes the computer to perform a method for automatically deciding a value of an Internet address that is not overlapped in an environment where a plurality of similar IP address deciding devices, each having its own MAC address, are used, the method comprising at an IP address deciding device the steps of:

selecting an IP address that is intended for use as its own MAC address;

sending an address resolution request packet using the selected IP address as that of a transmitter and as a requested address;

observing for a predetermined period of time whether or not an address resolution request packet, including an identical IP address used as that of a transmitter and as a requested address and a MAC address different from its own MAC address, is sent;

when the address resolution request packet is not observed, then setting the IP address as its own IP address to finish the operation, and when the address resolution request packet is observed, then judging whether the MAC address included in the packet is smaller than its own MAC address; and when the MAC address is smaller than its own MAC address, then setting the IP address as its own IP address to finish the operation, and when the MAC address is not smaller than its own MAC address, then selecting another IP address that is to be used.

5. A computer-based apparatus operative to select an IP address for an added device that does not overlap with other addresses among an effective address range permitted as IP addresses, the apparatus comprising:

a collecting unit for detecting and collecting addresses of all other devices connected with the added device to a network by receiving and analyzing signals flowing through the network;

a sectioning unit for sectioning binary numerals of the collected IP address at Nth bit (1≦N≦K, K is a predetermined natural number) from a minimum digit, and defining digits not less than the Nth bit as high rank bits and digits lower than Nth bit as low rank bits;

a judging unit for judging whether all of the high rank bits of the collected IP addresses are the same;

if all of the high rank bits are not the same, a changing unit for changing N to N+1, N−1, or to a desired number, and sectioning the binary numerals in the step of sectioning to make the judgment at the judgment step;

a repeating unit for repeating the number changing step until all of the high rank bits become the same;

if all of the high rank bits are the same, an adopting unit for adopting a value expressed by a binary number composed of the same high rank bits and low rank bits set all to 0 as an IP network address, and adopting a value expressed by a binary number composed of high rank bits set all to 1 and low rank bits set all to 0 as subnet mask; and a selecting unit for selecting an IP address, which is different from the IP address of any other device connected to the network, from among a group of effective IP addresses defined by the IP network address and the subnet mask.

6. A computer-based apparatus operative to automatically decide a value of an Internet address that is not overlapped in an environment where a plurality of similar IP address deciding devices, each having its own MAC address, are used, the apparatus comprising at an IP address deciding device:

a selecting unit for selecting an IP address that is intended for use and its own MAC address;

a sending unit for sending an address resolution request packet using the selected IP address as that of a transmitter and as a requested address;

an observing unit for observing for a predetermined period of time whether or not an address resolution request packet, including an identical IP address used as that of a transmitter and as a requested address and a MAC address different from its own MAC address, is sent;

when the address resolution request packet is not observed, then a setting unit for setting the IP address as its own IP address to finish the operation, and when the address resolution request packet is observed, then a judging unit for judging whether the MAC address included in the packet is smaller than its own MAC address; and when the MAC address is smaller than its own MAC address, then the setting unit for setting the IP address as its own IP address to finish the operation, and when the MAC address is not smaller than its own MAC address, then second selecting unit for selecting another IP address that is to be used.

* * * * *